(12) United States Patent
Berg

(10) Patent No.: US 12,178,165 B2
(45) Date of Patent: *Dec. 31, 2024

(54) PALM TREE TRIMMER SYSTEM

(71) Applicant: Thomas Berg, Redlands, CA (US)

(72) Inventor: Thomas Berg, Redlands, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/420,670

(22) Filed: Jan. 23, 2024

(65) Prior Publication Data
US 2024/0365726 A1 Nov. 7, 2024

Related U.S. Application Data

(63) Continuation-in-part of application No. 18/312,010, filed on May 4, 2023, now Pat. No. 11,877,543.

(51) Int. Cl.
*A01G 23/095* (2006.01)
*B27L 1/06* (2006.01)

(52) U.S. Cl.
CPC ............ *A01G 23/0955* (2013.01); *B27L 1/06* (2013.01)

(58) Field of Classification Search
CPC .................. A01G 23/095; A01G 23/0955
See application file for complete search history.

(56) References Cited

U.S. PATENT DOCUMENTS

| | | | | |
|---|---|---|---|---|
| 6,672,346 B1 * | 1/2004 | Heckmaier | ........ | A01G 23/0955 47/1.01 R |
| 7,997,311 B2 * | 8/2011 | Prout, Jr. | .................. | A01G 7/06 144/208.2 |
| 8,517,066 B1 * | 8/2013 | Van De Mortel | ......... | B27L 1/06 144/24.13 |
| 9,370,142 B2 * | 6/2016 | Barnhill | ................. | B25J 9/0009 |
| 10,021,840 B2 * | 7/2018 | Stout | ................... | A01G 23/0955 |
| 10,486,302 B2 * | 11/2019 | Hayden | ...................... | B25J 5/00 |
| 2007/0181217 A1 * | 8/2007 | Ahdoot | .............. | A01G 23/0955 144/24.13 |

FOREIGN PATENT DOCUMENTS

EP 4342287 A1 * 3/2024 ......... A01G 23/0955

* cited by examiner

*Primary Examiner* — Matthew Katcoff
(74) *Attorney, Agent, or Firm* — Michael L. Greenberg, Esq.; Greenberg & Lieberman, LLC

(57) ABSTRACT

A remote-operated palm tree trimming system and apparatus, configured to ascend a palm tree safely via treaded tires and trim the tree via at least one saw blade. The tires are disposed in communication with actuators which apply pressure against the trunk of the tree, ensuring that the tires maintain adequate grip to overcome gravity during ascent. A remote control, operated by user on the ground, enables control of the wheels, actuators, and saw blade, facilitating manipulation of the device to effectively trim the tree remotely, ensuring the safety of the operator.

2 Claims, 6 Drawing Sheets

PALM TREE TRIMMER SYSTEM

CROSS-REFERENCE TO RELATED APPLICATIONS

This application is a continuation-in-part patent application of non-provisional patent application Ser. No. 18/312,010, filed on May 4, 2023, and priority is claimed thereto.

FIELD OF THE PRESENT INVENTION

Palm trees in your backyard are a great way to add greenery and character to your property. However, they can also be messy and inconvenient if they grow too large or start falling over on other plants. They are fast-growing trees that can become quite large, especially when planted in direct sunlight. Palm trees are known to require maintenance, namely trimming, to keep them healthy and looking their best.

BACKGROUND OF THE PRESENT INVENTION

Annual pruning, storm damage, or disease may force a tree owner to trim their tree. Trimming palm trees can be challenging, especially if one lacks experience working with outdoor tree trimmers. It can be nerve-wracking to take on a large tree as your first project, no matter how much experience you have working with tools. As the trees are often tall, the biggest challenge relates to ascending to the top of the tree to facilitate trimming correctly. Because of these factors, hiring an arborist or professional to trim the trees for you may seem more manageable. However, even professionals may be injured climbing especially tall trees for trimming. Man-lifters or 'cherry-pickers' are often used when needed, which are notoriously expensive to rent and require a good amount of space to safely operate. If the tree is located near a road, a portion of the road may need to be closed. If the tree is located far from a road, such as in a back yard, it may be impossible to dispose a man-lifter to the site of the tree, forcing the individual to rely on ladders and ropes to ascend the tree.

Trimming palm trees can be a scary proposition for the inexperienced homeowner. After all, these are not conventional deciduous trees. They do not grow in an ideal straight cylinder shape but rather in a wild and wooly cone shape that often includes heavy fronds and branches shooting out at varying angles at the top. It's not uncommon for untrained homeowners to approach the idea of trimming a palm tree with fear and anxiety. Further, removing tree branches from palm trees is particularly challenging because the fronds feature needle-like barbs attached to husks and have sharp edges.

Remote tree trimming has been attempted on numerous occasions in the past. Since palm tree fronds have sharp needle-like barbs on the tips and the tops of these trees sometimes contain a lot of dust, debris, rubbish, and even rodents, this tool is beneficial when removing fronds or cycads. Cutting off and eliminating the fronds from the palm trunk is the most typical method for trimming and dressing palm plants. However, a majority of these remote tools require and extended pole with a saw disposed on top. Further, a majority of these tools are too short to facilitate the trimming of very tall trees such as palm trees. If there were a remote means of trimming palm trees that ensured the safety of the operator while being efficient at climbing the tree, regardless of height, palm tree trimming would be an easier, safer, and faster task.

Thus, there is a need for a new form of remote operated palm tree trimmer configured to employ motors to climb the tree and semi-autonomously trim requisite palm fronds and seed pods without endangering the operator. Such a trimmer is preferably configured to trim the top of a palm tree using a cutting ring that comprises a plurality of vertically oriented blades and is free to rotate within a housing ring. Further, such a trimmer is preferably operated and controlled from the ground by an operator via a remote control.

When using conventional remotely operated tree trimming equipment found in the prior art, these typical tree trimming tools create several issues and challenges, such as uneven cutting and a lack of stability and control when climbing and trimming. In contrast, the present invention is equipped with new features and capabilities not available in conventional devices which offers an enhanced tree pruning tool that tackles the abovementioned issues and challenges.

The capacity of the trimmer to leave a palm tree with a uniform appearance is another goal of the innovation. This is possible since the uneven husks that traditionally remain on the tree after trimming using traditional techniques are mostly avoided. Since the trimmer device can produce a more consistent visible exterior shape of the tree trunk or even an attractive surface design, nearby trees in a row can be trimmed to have the same uniform outer appearance.

When conventional methods are used to trim trees, the process is quite expensive due to the higher risk and potential responsibility involved. The operation requires a lot of manpower, and the initial investment of sophisticated lifting equipment adds another expenditure.

The palm frond next to the palm husk is normally manually chopped off and removed when trimming and/or dressing palm plants. In order to lift a trimmer to the desired location for trimming, you will need a mechanical hoist or another lifting device. Sometimes the trimming is done manually by climbing the tree with climbing equipment.

Recently, there have been advancements in power tools, specifically for trimming palms, which have made this job easier. These palm tree cutters are chainsaws that process large palm trees instead of typical trees, making cutting and trimming palms much easier and faster. However, they are generally hand-held, and require a user to extend a support pole manually to the location in need of trimming, making the process laborious and cumbersome. Further, this does not work for very tall trees, unlike the present invention, which can scale any palm tree of any height while ensuring the safety of the operator.

Thus, there is a need for a new remote controlled palm tree trimming apparatus and system configured to facilitate the safe and easy trimming of palm fronds remotely by a user. Such a system and device is preferably configured to scale the tree easily via motorized wheels, and employ a circular saw to cut the fronds as needed.

SUMMARY OF THE PRESENT INVENTION

The following brief and detailed descriptions of the drawings are provided to explain possible embodiments of the present invention but are not provided to limit the scope of the present invention as expressed herein this summary section.

The present invention is a palm tree trimming apparatus and system configured to scale a palm tree to the top, where trimming is needed, without necessitating the operator to climb the tree nor use a manlift. The palm tree trimmer includes a structural or support frame that is sturdy enough to provide structural support for the various other parts of the apparatus for climbing and trimming the tree. The support frame is shaped to encircle a tree trunk. The structural segment includes several movable parts that allow the structural segment to change configuration between an open configuration for positioning the device around the tree trunk and a closed configuration for supporting the climbing and trimming portion components of the tree to facilitate the climbing and trimming of the tree.

The tree trimming system and apparatus of the present invention includes a tree trimming device, a hand-held control that enables remote control of the device, and a cart that may be used to transport and mount the device on a tree trunk using a movable arm. After being placed, the user can instruct the device to climb the tree trunk by using the controller, and they can also use it to start and control cutting and finishing the tree once they have reached the appropriate position and height. While finishing often refers to abrading, sanding, peeling, and marking the tree trunk with a design, pattern, or logo, trimming typically refers to slicing or cutting branches, palm fronds, stems, and the like. A sample tree trimming device per various embodiments is shown in FIGS. 2 and 3. The palm tree trimmer of the present invention includes a structural or support frame that is sturdy enough to provide structural support for the various other parts of the apparatus for climbing and trimming the tree. The support frame is shaped to encircle a tree trunk. The structural segment includes some movable parts that allow the structural segment to change configuration between an open configuration for positioning the device around the tree trunk and a closed configuration for supporting the climbing and trimming portion components of the tree to facilitate climbing and trimming of the tree.

BRIEF DESCRIPTION OF DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PRESENT INVENTION

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Detailed reference will now be made to a first embodiment of the present invention, which is illustrated in FIGS. 1 through 5.

The present invention is a palm tree trimming system and apparatus which has been developed to trim palm trees of their aged fronds. The present invention employs a radio-controlled elevator-trimmer device that eliminates the need for a worker to climb the tree or use a man-lift to trim a palm tree. The device is equipped with a main frame (10) which is preferably constructed of carbon fiber to provide a strong and lightweight foundation that enables the device to easily climb the tree when compared with other heavier materials such as aluminum. Ideally, the present invention requires a two-person team for its operation: a spotter and a remote operator.

Figure 2:
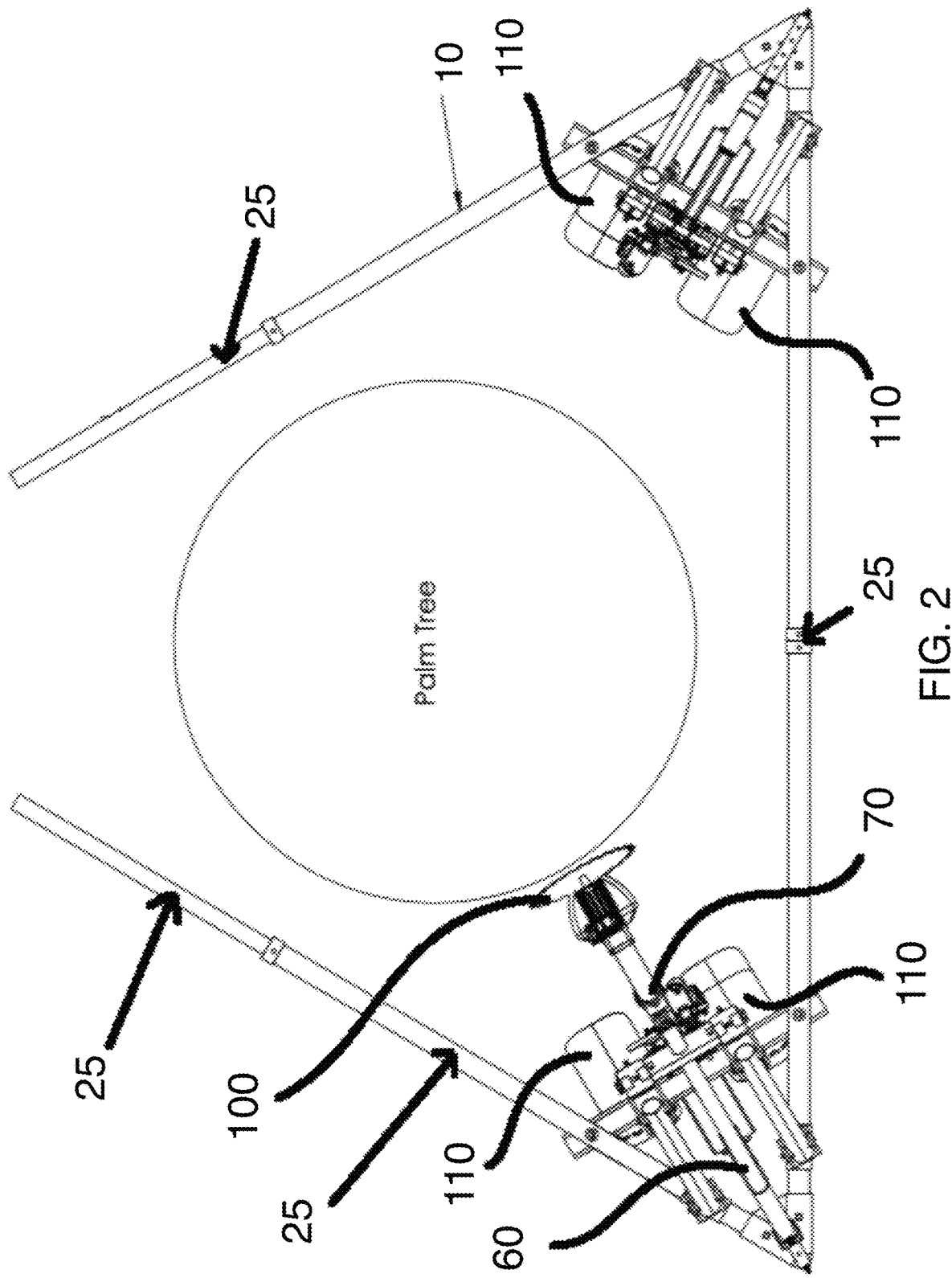
FIG. 2 shows the present invention positioned for use around a palm tree.
Figure 3:
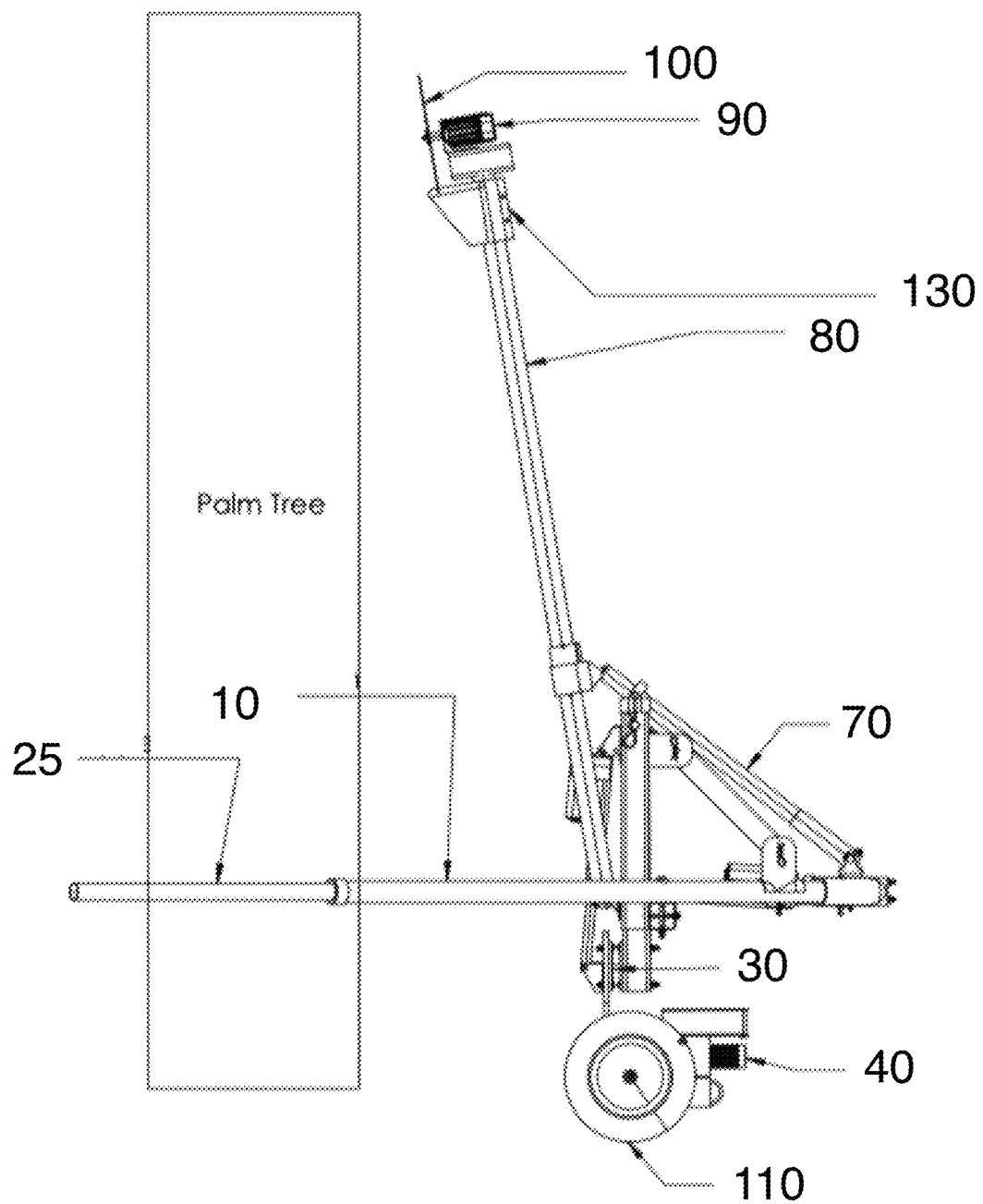
FIG. 3 shows a side view of the present invention with the wheels retracted.
Figure 4:
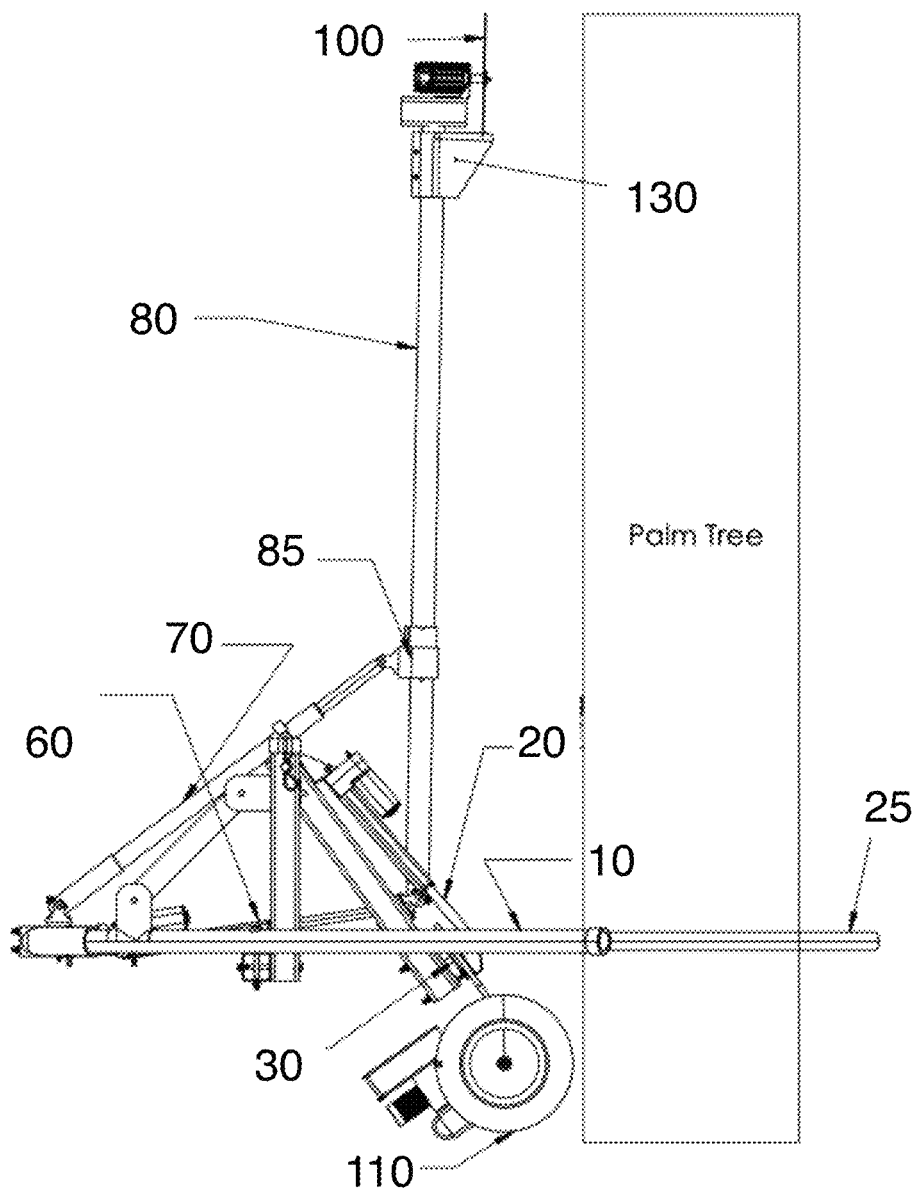
FIG. 4 shows a side view of the present invention with the wheels extended.

The side view shown in FIG. 2 and FIG. 3 depicts a turning plate (20) and a turning actuator (30), which are offset from a center of the device to allow movement of the turning plate (20) when extended or retracted. A pressure actuator (60) of the present invention may be extended to push wheels (110) toward the palm tree, or retracted back from the tree to release pressure from the tree. A driving motor (40) provides force through a worm gearbox (not illustrated) for additional torque and provides a self-locking mechanism to prevent the release of the wheels (110) against the tree trunk, ensuring the apparatus does not fall from the tree during ascent and use. A cutting arm (80) includes a horizontal cutting arm actuator (70), which moves the cutting arm (80) either away from, or closer to the tree. A cutting arm bracket slotted stabilizer (85) is present at the junction between the cutting arm (80) and the horizontal cutting arm actuator (70) as shown in FIG. 4, which helps to relieve some of the vibrations endured during the trimming process, ensuring that the cutting arm (80) remains in the target position. Finally, a saw blade (100), present on the end of the cutting arm (80), is a standard circular saw, attached to a top of the cutting arm (80). A tree bumper (130) is used to prohibit the saw blade (100) from direct contact with the tree trunk.

In order to provide a sufficient structure for supporting the climbing and trimming components mentioned below, the frame (10) is preferably made of extruded structural aluminum forms and/or carbon fiber that are assembled utilizing various attaching joints at the corners, attaching plates, and brackets. Numerous manufacturers produce the fundamental structural aluminum (and/or carbon fiber) members, which are easily put together by mitering the ends and joining with pre-made parts using similar aluminum extrusions with threaded fasteners and tapped closures that slide into encapsulating grooves that are shaped into the fundamental aluminum forms. One can employ any kind of mechanical device or material that can sustain the climbing section and trimming portion of the device.

A spotter is preferably present to aid the operator by providing information and direction, assisting in the effective operation of the system and apparatus of the present invention. The main components of the apparatus are the linear actuators and motors that have been programmed to respond to the radio controls used by the operator via a remote control (200). The apparatus is configured to climb the palm tree by use of the three sets of wheels (110) positioned at three points around the tree when the pressure actuators (60) and the wheels (110) are engaged as directed by the Operator. Note: This Radio Operated palm tree trimmer (RO-PTT) is also referred to as a Radio Controlled palm tree trimmer (RC-PPT).

Batteries (optional), a trimmer control box (210) and a power cord (170) are included with the present invention. To shape the top of the palm tree, the present invention is configured to climb and descend a trunk of the palm tree. The saw blade(s) (100) that extend upward with the cutting arm (80) may revolve within a blade housing ring for added safety if desired.

Figure 1A:
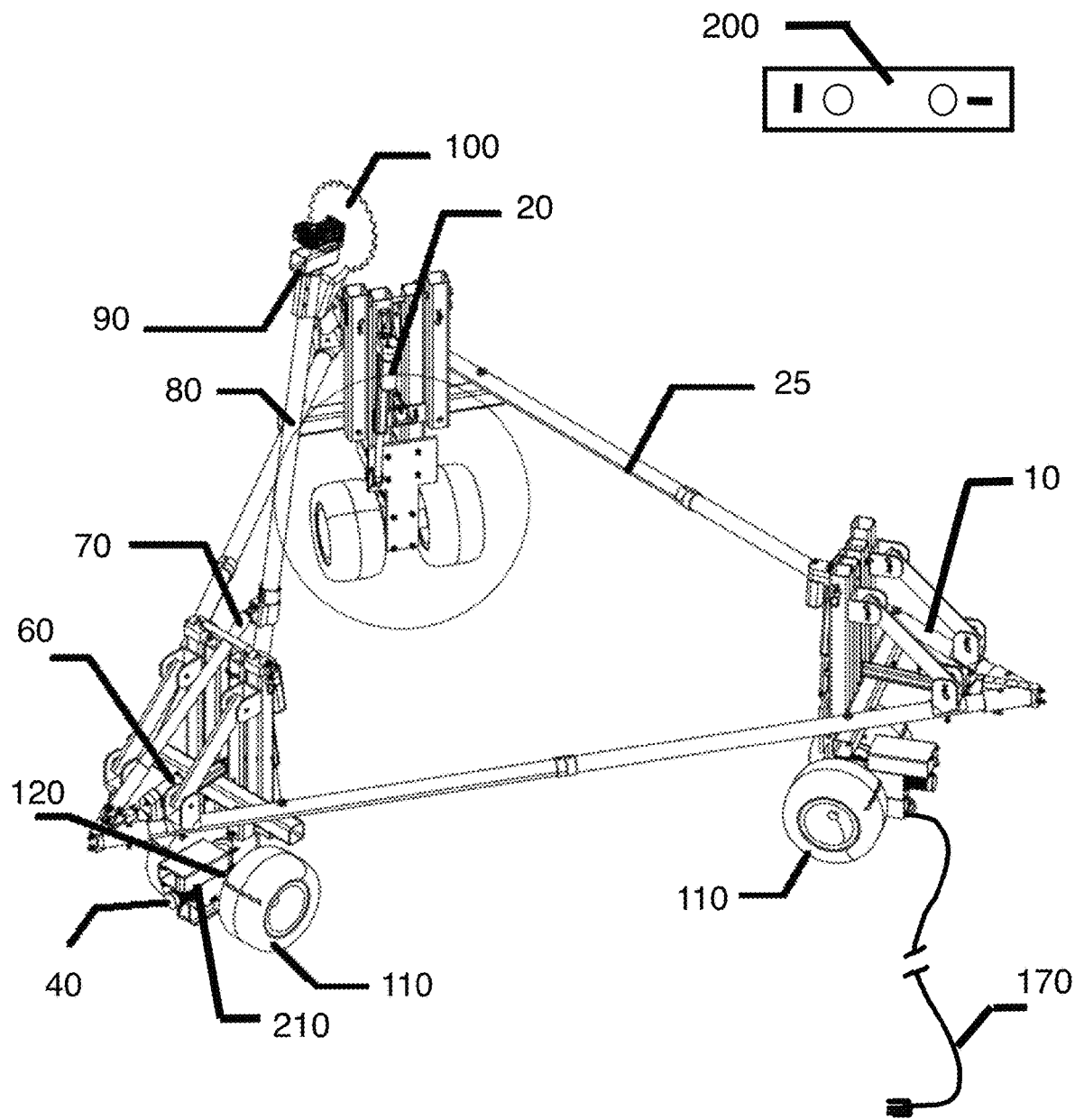
FIG. 1A details the present invention shown from above, detached from a palm tree, exhibiting an isometric view of the machine fully assembled.
Figure 1B:
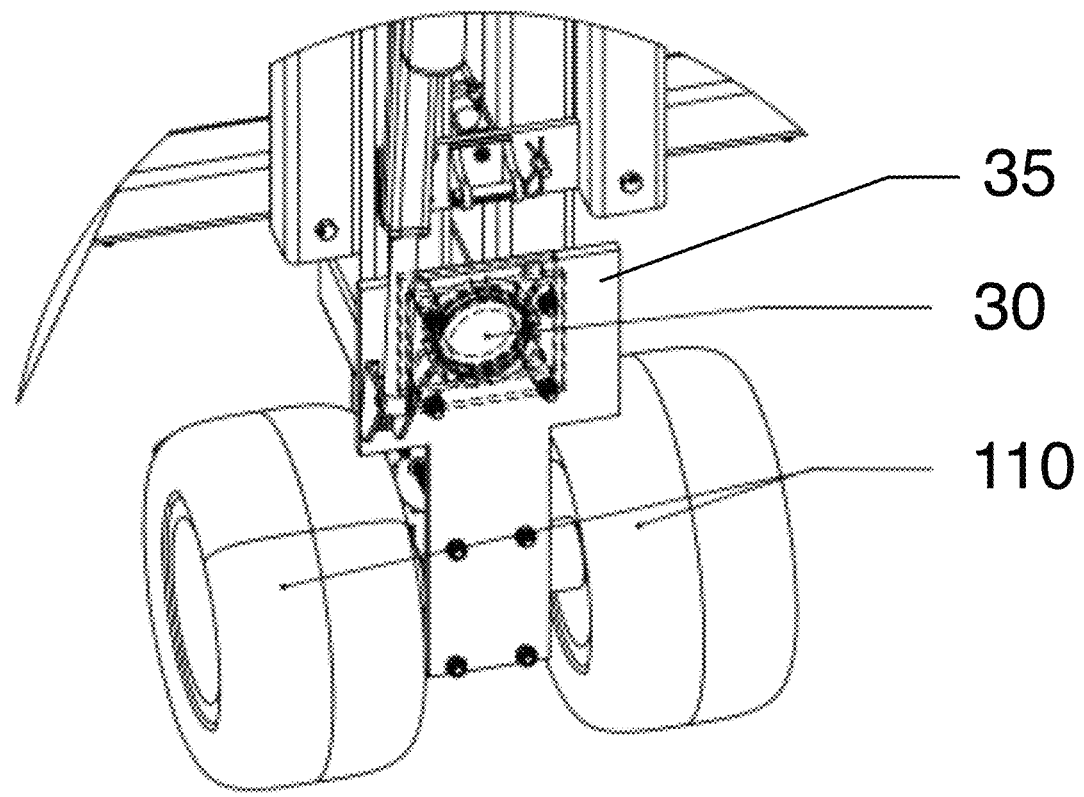
FIG. 1B is a detail view of the wheel assembly of the present invention, showing the steel turn table and carbon fiber plate.

As shown in FIG. 1B, a steel turn table (30) is preferably present at a junction between the wheels (110) and the main frame (10) which facilitates the rotation of the wheels from a vertical orientation to a horizontal orientation. This enables the present invention to maneuver horizontally around the tree once at the desired height to reach the fronds in need of trimming around the entirety of the circumference of the tree.

It should be understood that the main frame (10) of the present invention is equipped with three sets of wheels (110), each set disposed equidistant from one another in a triangular configuration as shown in FIG. 1. Each set of wheels (110) is disposed in communication with a pressure actuator (60) which enables the wheels (110) to pivot inwards towards the trunk of the tree, and apply pressure to the trunk of the tree to aid the grip of the wheels during its ascent. The main frame (10) is constructed with lightweight materials such as carbon fiber. Slipper tubes (25) are disposed between each set of wheels (110), connecting them together to form the triangular shape of the main frame (10). Each set of wheels (110) is mounted to the turn table (30) which is disposed in communication with a carbon fiber plate (35). The turn table (30) enables the rotation of the wheel set, as a whole, in a vertical 360 rotation relative to the primary axis of the main frame (10). A transmission (120) is disposed in communication with the driving motor (40) which preferably employs a worm gearbox to provide additional torque and to provide a self-locking mechanism to prevent release of the wheels against the tree trunk once the desired height is reached.

Figure 5:
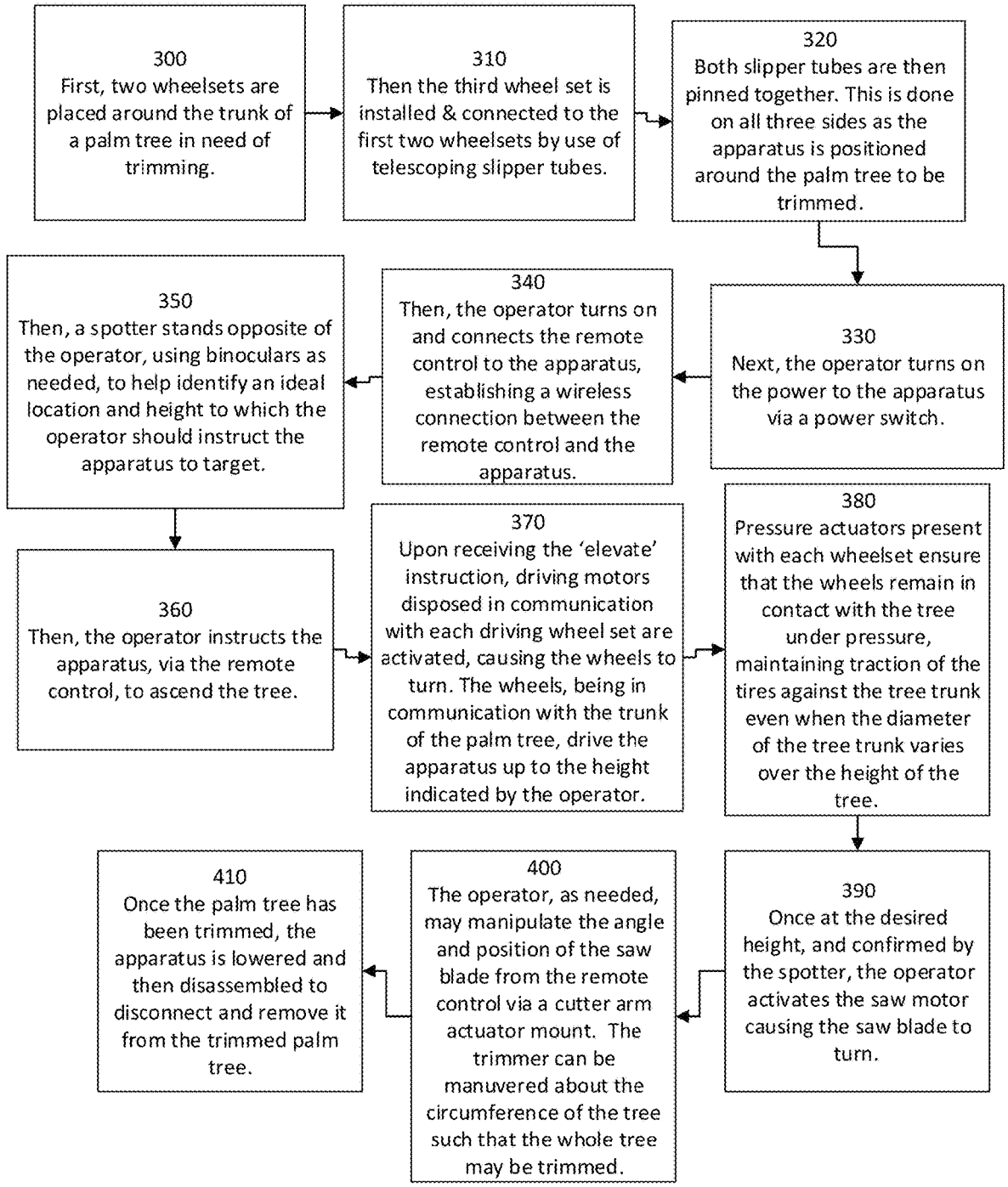
FIG. 5 depicts a flow chart detailing the process of use of the present invention by two individuals.

The process of use of the system and apparatus of the present invention, as shown in FIG. 5, is preferably as follows:

1. First, two wheelsets are placed around the trunk of a palm tree in need of trimming. (300)
2. Then the third wheel set is installed & connected to the first two wheelsets by use of telescoping slipper tubes. (310)
3. Both slipper tubes are then pinned together. This is done on all three sides as the apparatus is positioned around the palm tree to be trimmed. (320)
4. Next, the operator turns on the power to the apparatus via a power switch. (330)
5. Then, the operator turns on and connects the remote control to the apparatus, establishing a wireless connection between the remote control and the apparatus. (340)
6. Then, a spotter stands opposite of the operator, using binoculars as needed, to help identify an ideal location and height to which the operator should instruct the apparatus to target. (350)
7. Then, the operator instructs the apparatus, via the remote control, to ascend the tree. (360)
8. Upon receiving the 'elevate' instruction, driving motors disposed in communication with each driving wheel set are activated, causing the wheels to turn. The wheels, being in communication with the trunk of the palm tree, drive the apparatus up to the height indicated by the operator. (370) Turning around the tree is accomplished via the wheels, once turned, enabling rotation of the entire apparatus.
9. Pressure actuators present with each wheelset ensure that the wheels remain in contact with the tree under pressure, maintaining traction of the tires against the tree trunk even when the diameter of the tree trunk varies over the height of the tree. (380)
10. Once at the desired height, and confirmed by the spotter, the operator activates the saw motor (90) causing the saw blade to turn. (390)
11. The operator, as needed, may manipulate the angle and position of the saw blade from the remote control via a cutter arm actuator mount. (400)
12. Once the palm tree has been trimmed, the apparatus is lowered and then disassembled to disconnect and remove it from the trimmed palm tree. (410)

It should be understood that the present invention is capable of trimming a palm tree both vertically and horizontally, as the wheel sets (110) pivot about the turntable (30) to enable horizontal rotation of the apparatus about the trunk of the tree.

In some alternate embodiments of the present invention, a bumper plate is employed to maintain alignment between the wheels (110) and the saw blade. In such embodiments, the wheels (110), bumper plate, and saw blade (100) are maintained in vertical alignment as the bumper plate keeps the wheels (110) properly positioned on the palm tree and assists in keeping the saw blade (100) positioned a specific distance from the palm tree trunk. Further, in preferred embodiments of the present invention, the apparatus is connected to an AC power source via at least one wire. The AC power is converted to DC power at the motor of set of wheels (110). AC power is preferred as AC power is more reliably constant than battery power, especially in cooler weather.

Further, it should be understood that the present invention is a remote-operated palm tree trimming apparatus equipped with a main frame, the main frame (10) is triangular having a first point, second point, and third point (as it is triangular when constructed as shown in FIG. 1A); wherein said first point is connected to said second point and said third point via slipper tubes; wherein said second point is connected to said third point via slipper tubes; a first wheel set (110), said first wheel set (110) disposed at said first point; a first pressure actuator (60), said first pressure actuator disposed in communication with said first wheel set (110); a first driving motor, said first driving motor disposed in communication with a first transmission and said first wheel set; wherein said first wheel set (110) is mounted to a first turning plate which enables the rotation of said first wheel set (110) 360 degrees relative to a primary axis of said main frame (10); a cutting arm (80), said cutting arm (80) disposed in communication with a cutting arm actuator (70) configured to facilitate the movement of said cutting arm (80) towards or away from the tree; a trimmer control box, said trimmer control box mounted to said main frame; an AC power source, said AC power source disposed in communication with said trimmer control box; a saw blade (100), said saw blade (100) disposed on said cutting arm (80); a second wheel set, said second wheel set disposed at said second point; a second pressure actuator, said second pressure actuator disposed in communication with said second wheel set; a second driving motor, said second driving motor disposed in communication with a second transmission and said second wheel set; a third wheel set, said third wheel set disposed at said third point; wherein said second wheel set is mounted to a second turning plate which enables the rotation of said second wheel set 360 degrees relative to a primary axis of said main frame; a third pressure actuator, said third pressure actuator disposed in communication with said third wheel set; a third driving motor, said third driving motor disposed in communication with a third transmission and said third wheel set; wherein said third wheel set is mounted to a third turning plate which enables the rotation of said third wheel set 360 degrees relative to a primary axis of said main frame; a remote control, said remote control equipped with a first transmitter; a remote receiver, said remote receiver disposed within said trimmer control box in communication with said power source via said AC cable; and wherein said cutting arm actuator and said saw blade are configured to be manipulated remotely via said remote control.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A remote-operated palm tree trimming apparatus comprising:
    a main frame, said main frame having a first point, second point, and third point;
    wherein said first point is connected to said second point and said third point;
    wherein said second point is connected to said third point;
    a first wheel set, said first wheel set disposed at said first point;
    a first pressure actuator, said first pressure actuator disposed in communication with said first wheel set;
    a first driving motor, said first driving motor disposed in communication with a first transmission and said first wheel set;
    wherein said first wheel set is mounted to a first turning plate which enables the rotation of said first wheel set 360 degrees relative to a primary axis of said main frame;
    a cutting arm, said cutting arm disposed in communication with a cutting arm actuator;
    a trimmer control box;
    an AC power source;
    a saw blade;
    a second wheel set, said second wheel set disposed at said second point;
    a second pressure actuator, said second pressure actuator disposed in communication with said second wheel set;
    a second driving motor, said second driving motor disposed in communication with a second transmission and said second wheel set;
    wherein said second wheel set is mounted to a second turning plate which enables the rotation of said second wheel set 360 degrees relative to a primary axis of said main frame;
    a third wheel set, said third wheel set disposed at said third point;
    a third pressure actuator, said third pressure actuator disposed in communication with said third wheel set;
    a third driving motor, said third driving motor disposed in communication with a third transmission and said third wheel set; and
    wherein said third wheel set is mounted to a third turning plate which enables the rotation of said third wheel set 360 degrees relative to a primary axis of said main frame.

2. The apparatus of claim 1, wherein said trimmer control box is disposed in communication with said first driving motor, said second driving motor, and said third driving motor.

* * * * *